US005435358A

United States Patent [19]
Kempka et al.

[11] Patent Number: 5,435,358
[45] Date of Patent: Jul. 25, 1995

[54] FUEL TANK FILLER NECK CLOSURE

[75] Inventors: Karl-Heinz Kempka, Esslingen; Uwe Kreckel, Unterensingen; Oliver Meister, Stuttgart, all of Germany

[73] Assignee: Mercedes-Benz AG, Germany

[21] Appl. No.: 199,768

[22] Filed: Feb. 22, 1994

[30] Foreign Application Priority Data

Feb. 22, 1993 [DE] Germany .................... 43 05 394.7

[51] Int. Cl.6 ............................................. B60K 15/05
[52] U.S. Cl. ..................... 141/312; 141/349;
141/98; 141/94; 141/368; 220/86.2; 220/336;
220/DIG. 33; 251/250.5; 251/352
[58] Field of Search ............ 141/94, 98, 312, 346,
141/348–350, 368, 382–384, 386; 220/86.2, 336,
288, 291, 292, DIG. 33; 251/162, 250.5, 351,
352; 901/6

[56] References Cited

U.S. PATENT DOCUMENTS

| 2,145,758 | 1/1939 | Fellows et al. ............... 220/336 |
| 3,319,671 | 5/1967 | Wiseman .................... 141/346 |
| 3,527,268 | 9/1970 | Ginsburgh .................. 141/98 |
| 3,642,036 | 2/1972 | Ginsburgh et al. ........... 141/94 |
| 4,440,382 | 4/1984 | Pruvot et al. .............. 251/162 X |
| 4,881,581 | 11/1989 | Hollerback ................ 141/98 X |
| 5,029,624 | 7/1991 | McCunn et al. ............. 141/346 |
| 5,145,081 | 9/1992 | Gravino ................... 220/86.2 |
| 5,238,034 | 8/1993 | Corfitsen ................. 141/94 |
| 5,242,075 | 9/1993 | Ott et al. ................. 220/361 |

FOREIGN PATENT DOCUMENTS

| 0460950 | 11/1949 | Canada ................... 220/288 |
| 0265829 | 5/1988 | European Pat. Off. . |
| 0498070 | 8/1992 | European Pat. Off. . |
| 4039269 | 2/1992 | Germany . |
| 4217966 | 5/1993 | Germany . |

Primary Examiner—J. Casimer Jacyna
Attorney, Agent, or Firm—Evenson, McKeown, Edwards & Lenahan

[57] ABSTRACT

A closure for a fuel tank filler neck has a closure cap which is swivel-mounted on the upper side of the said closure and can be opened from the closed position by the effect of force on a lever arm arranged on the far side of the swivel axis. A pawl for locking and unlocking of the closure cap is swivellable and prestressed in the closing sense or direction by spring force and has an outwardly extending lever arm for mechanically lifting the pawl against the spring force. To ensure a permanent and reliable closing function of the closure cap, the filler neck bears an axially accessible adjusting ring which is arranged coaxially with respect to the cap. The ring is mounted rotatably on the outer circumference of the latter and/or on the axial end face of a shoulder thereof, and has on its upper side, at least in a subregion, a spiral toothing. A toothed segment is arranged on the lever arm of the closure cap. The teeth of the toothed segment are in engagement with the spiral toothing of the ring such that a turning of the adjusting ring has the effect that a force acting in the opening or closing sense can be exerted on the closure cap.

12 Claims, 6 Drawing Sheets

FUEL TANK FILLER NECK CLOSURE

BACKGROUND AND SUMMARY OF THE INVENTION

The present invention relates to a closure for a fuel tank filler neck, including a closure cap swivel-mounted on an upper side of the closure and openable from a closed position by a force acting on a lever arm arranged at a remote side of the swivel axis.

German Patent No. Specification 4,217,966 discloses a closure with a closure cap having at its swivel axis a closing spring prestressed in the closing direction. Upon the swivelling back of the closure cap into the closed position, the cap presses the pawl to the side in order to engage therebehind. If, however, over a period of time, the closing spring shows signs of fatigue and/or dirt particles enter into the swivel mounting of the closure cap, a secure closure of the filler neck is no longer provided, because the closing force of the spring is then not adequate to accomplish a sealed bearing contact of the cap against the passage opening. In that case, the closing force may be so minimal that not even the pawl is overcome, meaning that the cap rests on the pawl. As a result, fuel in a gaseous and liquid state can escape from the tank, which leads to the vehicle and other road users being put at risk and to the environment being polluted.

An object of the present invention is to provide a closure such that a permanent and reliable closing function of the closure cap is ensured. This object has been achieved according to the present invention in the following ways. According to a first embodiment, an axially accessible adjusting ring, is arranged coaxially with respect to the filler neck and is at least one of mounted rotatably on an outer circumference of the filler neck and on an axial end face of a shoulder of the filler neck. The ring has on its upper side, at least in a subregion thereof, spiral toothing, and the lever arm on the closure cap has a toothed segment with teeth configured and arranged to engage with the spiral toothing of the ring such that a turning of the adjusting ring exerts the force for opening and closing the closure cap. According to a second embodiment, the swivel axis is arranged parallel to an axis of the filler neck. A driving element is arranged in proximity to the swivel axis, outside a clear cross-section of the passage, for effecting a swivelling movement of the closure cap, and an adjusting ring is one of mounted concentrically with respect to the filler neck and able to be inserted therein in a centered manner, via a corresponding mating form-fit element connected with a form fit to the driving element, for initiating the swivelling movement of the closure cap.

Because of the positive drive of the closure cap, acting both in the opening direction and in the closing direction, the force exerted on the swivelling of the closure cap can, in all events, exceed a resistance opposing the swivelling movement, which resistance may be caused, for example, by dirt particles lodged in the mechanism. This means that any swivel position can nevertheless be adopted. Moreover, it is possible to dispense with the arrangement of a closing spring, which prevents a fatigue-induced reduction in closing force from occurring. Altogether, consequently a permanent and reliable closing function of the closure cap is achieved by the invention.

BRIEF DESCRIPTION OF THE DRAWINGS

These and other objects, features and advantages of the present invention will become more apparent from the following detailed description thereof when taken in conjunction with the accompanying drawings wherein.

DETAILED DESCRIPTION OF THE DRAWINGS

Figure 1:
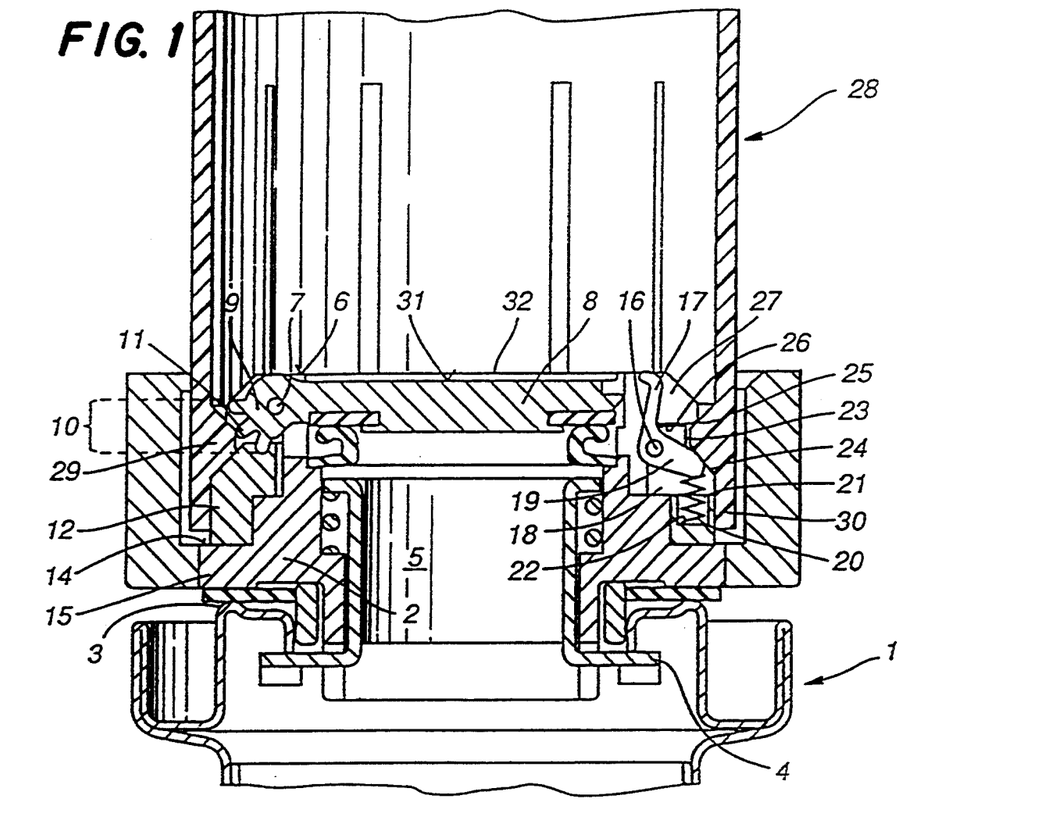
FIG. 1 is a cross-sectional view of closure according to the present invention, comprising a closure cap which can be swivelled against the direction of movement of a robot-guided fuel-pump nozzle, in the closed position and unlocked state.

As can be readily seen in FIG. 1, a filler neck 1 of a fuel tank has on the filling side an associated support part 2, which bears on the underside in a sealing manner against a circumferential edge 3 of the neck 1 and is releasably connected by a bayonet catch 4. The support part 2 has a central passage 5 for filling the tank with fuel and has, on its upper side 6, a closure cap 8, swivel-mounted on a swivel axis 7.

Figure 2:
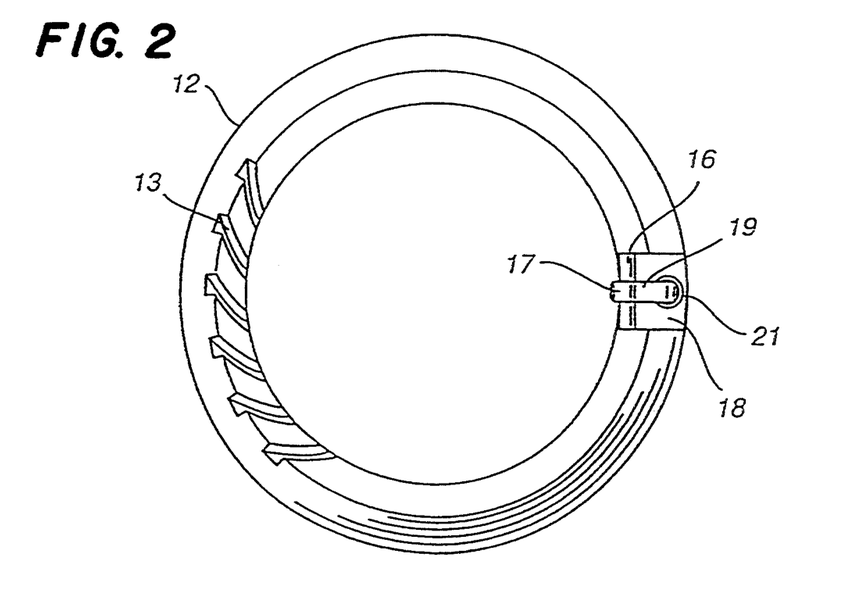
FIG. 2 is a plan view a section of an adjusting ring for the closure cap of FIG. 1.

Arranged on the closure cap 8 on the far or remote side of the swivel axis 7 is a lever arm 9 which has a toothed segment 10 on its circumference. The teeth 11 of the segment 10 are in engagement with a spiral toothing 13 formed in a subregion on the upper side of an adjusting ring 12 as best seen in FIG. 2. The support part 2 bears on the axial end face 14 of a shoulder 15 the adjusting ring 12 which is axially accessible and arranged coaxially with respect to the support part 2 and is mounted rotatably on the latter.

A pawl 17 is fastened on the adjusting ring 12 at a location diametrically opposite the toothing region for locking and unlocking the closure cap 8 in a swivel mounting 16. A radial clearance 18 is provided in the adjusting ring 12 for the free swivelling action of the pawl 17 which has an outwardly extending lever arm 19 to be actuated for the mechanical lifting of the pawl 17 against a spring force which prestresses the pawl 17 in a closing direction. The spring 20 can be configured as a helical compression spring and accommodated in an axial recess 21, formed on the adjusting ring 12 and open towards the lever arm 19 of the pawl 17 lying thereabove. The spring 20 is supported, on one hand, on the lever arm 19 and, on the other hand, on the base 22 of the recess 21.

On the circumference of the support part 2, there is provided a cross-sectionally trapezoidal and radially outwardly opening circumferential groove 23 serving as an engaging groove for a filling head. The lower flank 24 of the groove 23, situated closer to the tank, is formed by a bevelled-off shoulder on the adjusting ring 12, and the opposite upper flank 25 of the groove 23 is formed by the underside 26 of a collar 27 formed on the upper side on the support part 2.

The mounting of the pawl 17 on the adjusting ring 12 requires a substantial recessing of the support part 2, because the pawl 17 turns along with the adjusting ring 12, with a turning of about 45° being assumed. As an alternative to the mounting of the pawl as described above, the pawl can also be mounted directly on the support part 2 such that a recess is required on the adjusting ring for the pawl to ensure the free swivelling action of the adjusting ring. Under certain circumstances in this alternative construction, the adjusting ring may be formed in the recess region with a reduced cross-section, i.e. it is possible to dispense with a complete recessing of the ring. It is, furthermore, within the contemplation of the present invention that on an adjusting ring configured such that there is supported a spring which presses the ring into the closed position, whereby the closing operation of the cap is positively assisted.

For filling the tank, a robot-guided fuel-tank nozzle 28 is then brought axially up to the filler neck 1. The end of the nozzle has a ring of axial flexible tongues, each of which on the inside has a claw 29 corresponding to the cross-section of the aforementioned engaging groove, to which there axially adjoins in each case a segment of a centering collar 30. Upon coupling the fuel-pump nozzle 28 onto the filler neck 1, the centering collar 30 is fitted onto the adjusting ring 12. The claws 29 engage in the circumferential groove 23 and thereby effect with the centering collar 30 a fixed play-free and consequently secure seating of the fuel-pump nozzle 28 on the filler neck 1. At the same time, the fuel-pump nozzle 28 is aligned exactly coaxially with respect to the filler neck 1 without the risk of tilting.

During the engaging in the circumferential groove 23, a claw 29 presses the lever arm 19 of the pawl 17 down against the closing force of the spring 20, whereby the pawl 17 is lifted in a swivelling movement from the closure cap 8 and is thereby unlocked from the latter.

By pressing home and turning the filling head of the fuel-pump nozzle 28, the adjusting ring 12 is turned in the same sense or direction, on account of the supporting of the claws 29 on its bevelled-off shoulder. The engagement of the spiral toothing 13 on the adjusting ring 12 with the toothed segment 10 arranged on the closure cap 8 causes the cap 8 to be swivelled about the swivel axis 7 out of the closed position into an open position. The closing of the cap 8 after filling the tank is performed in a reverse sequence to that sequence employed during opening. After reaching the closed position, the fuel-pump nozzle 28 is uncoupled from the filler neck 1, and the claws 29 disengage from the circumferential groove. On account of the now absent counterforce, the spring 20 presses the lever arm 19 of the pawl 17 upwards until the latter latches onto the closure cap 8 and consequently locks the latter.

For manual opening of the closure cap 8, there may be provided on its upper side 31 a gripping ring 32, by which the cap 8 can be drawn on. After filling the tank, the cap 8 can be pressed in a simple way into its closed position. For trouble-free actuation of the closure cap 8, the spiral toothing 13 on the adjusting ring 12 and the counter-toothing on the lever arm 9 of the closure cap 8 are in this case to be configured with regard to the steepness of the spiral contour such that a self-locking of the mechanism formed therein occurs neither in the one nor in the other direction of power flow. As an alternative, however, to manual tank filling, the entire closure complex with support part, adjusting ring and closure cap may be unscrewed in a simple way from the filler neck like a conventional tank closure. As a result, the coupling of fuel-pump nozzles with rubber sleeves for gas return is simplified on account of the large cross-section of the filler neck now available.

Figure 3:
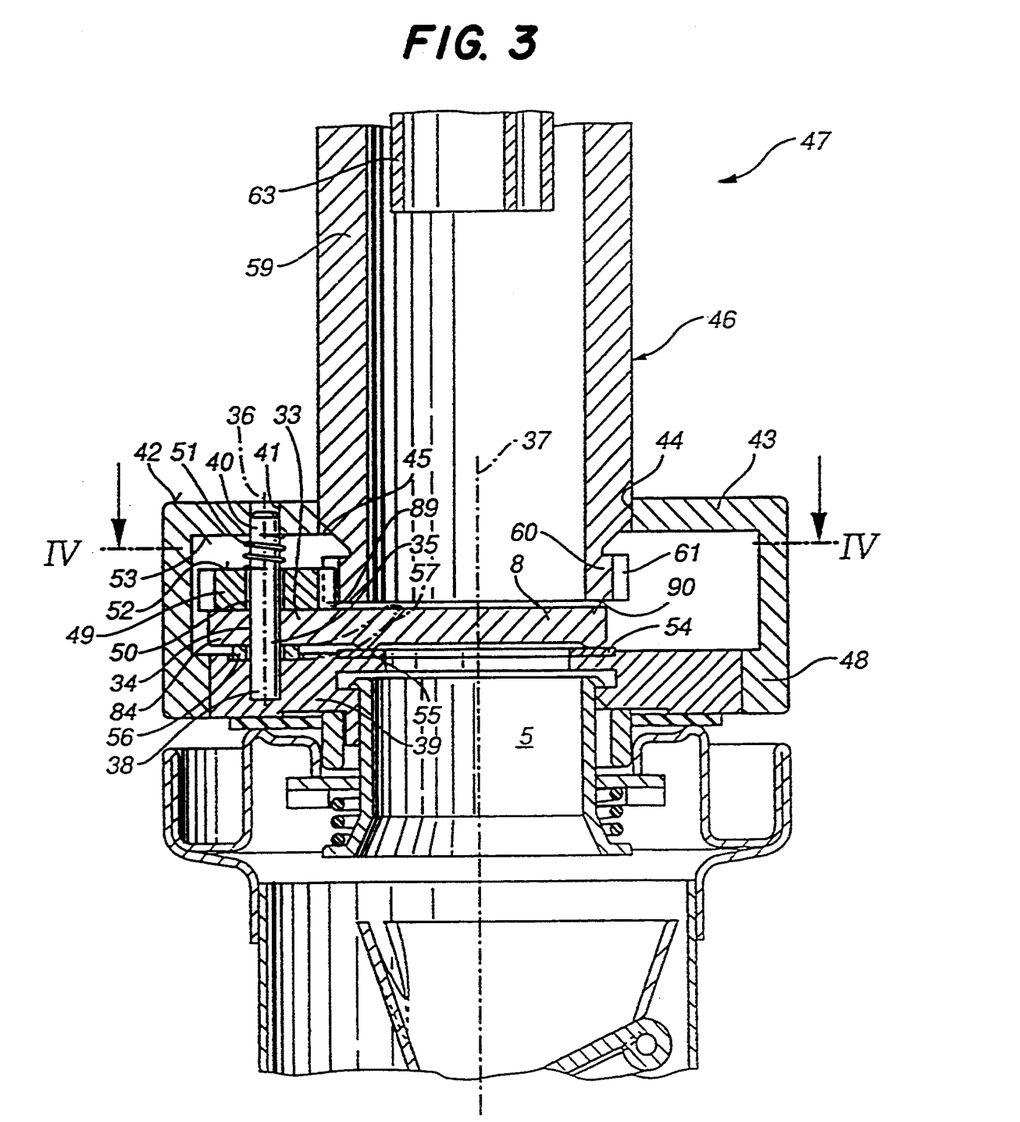
FIG. 3 is a cross-sectional view of the closure according to another embodiment of the present invention in the closed position, comprising a closure cap with a lifting device, which closure cap can be swivelled about an axis parallel to the filler neck axis, and a fuel-pump nozzle coupled to the filler neck.

Another embodiment of the present invention described is shown in FIG. 3. In this embodiment, the circular closure cap 8, in the closed position, has on the circumference a laterally protruding stem 33 configured so that the contour of the cap 8 with stem 33 is bulb-shaped. The cap 8 is fitted rotatably by a bore 34 provided on the stem 33, onto a bearing bolt 35. The axis 36 of the bolt 35 lies parallel to the filler neck axis 37 outside the clear cross-section of the passage 5 and is pressed by a lower end 38, facing the filler nozzle 1, into the upper side of a support part 39 of the closure. The end region 84 of the stem 33 forms the lever arm 9 of the closure cap 8.

At the upper end 40, the bearing bolt 35 is held in a coaxial bore 41 which is provided in an end face 42 of an annular guide housing 43 coaxially surrounding the support part 39 which end face 42 runs transversely to the filler nozzle axis 37 and above the cap 8. The end face 42 forms with the rim 44 of its central passage opening 45 a centering guide for a suction removal tube 46 of a fuel-pump nozzle 47. At the end 48 close to the filler neck, the guide housing 43 is circumferentially fastened on the support part 39.

As with the cover 8, a gearwheel 9 with a central bore 50 is rotatably fitted onto the bearing bolt 35 or a toothed segment facing the passage 5. The gearwheel 49 is attached on the upper side on the stem 33 of the cover 8 and serves as a driving element for the swivelling movement of the closure cap 8. The bearing bolt 35 is coaxially surrounded by a helical spring 51 which is supported, on one hand, on the upper side 52 of the gearwheel 49, facing away from the cap 8 and, on the other hand, on the underside 53 of the end face 42, facing the gearwheel 49, and presses the cap 8 in a sealing manner onto an annular flat gasket 54 surrounding the passage 5 of the support part 39. For improved sealing, the cap 8 has a circumferential sealing edge 55, which protrudes downwards and rests on the flat gasket 54.

Figure 4:
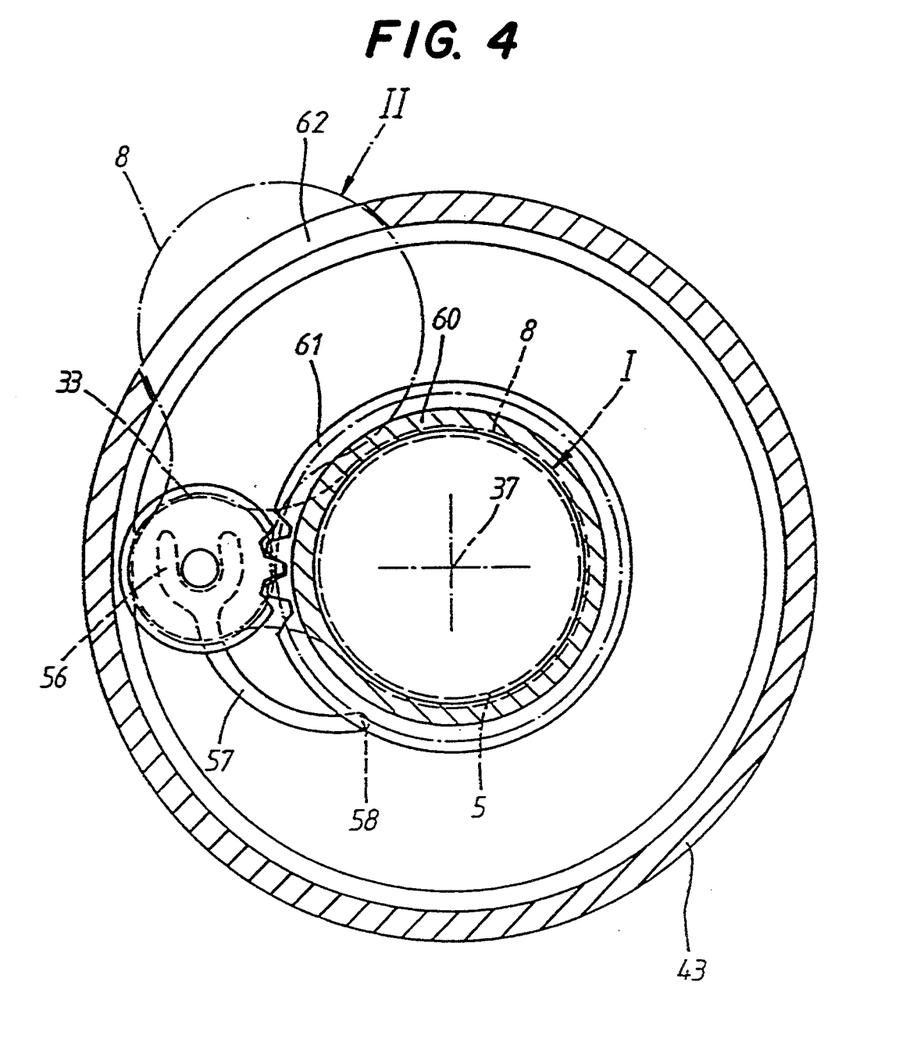
FIG. 4 is a cross-sectional view along line IV–V of FIG. 3 in the closed position and the open position.

Clamped in between the stem 33 of the closure cap 8 and the support part 39 is a fork-shaped end 56 of a rocker 57, which can be seen in FIG. 4, and is pushed onto the bearing bolt 35. The rocker has a bearing point for its tilting axis on the support part 39 and extends past the stem 33 and beyond the swivelling region of the stem 33. The axis 36 of the bearing bolt 35 forms the swivel axis of the closure cap 8. The free end 58 of the rocker 57 in this embodiment protrudes beyond the closure cap 8 and into the space which can be penetrated by the wall 59 of the suction removal tube 46 in the guide housing 43.

For opening the closure cap 8 and consequently for filling the tank, the fuel-pump nozzle 47 is taken by its suction removal tube 46 exactly coaxially with respect to the filler neck axis 37 to the passage 5 by way of the guide formed by the rim 44 of the guide housing end face 42. The lower end 60 of the suction removal tube 46 is configured as an adjusting ring which has a tooth 61 on its circumference. The tooth engages in the end position of the suction removal tube 46 in the toothing 89 of the gearwheel 49 or of the toothed segment in a mating form fit with the latter toothing. Also, the suction removal tube 46 presses by the butting edge 90 of its end 60 the free end 58 of the rocker 57 downwards, whereby the fork-shaped end 56 of the rocker 57 is raised against the spring force of the helical spring 51 as seen in dot-dash line in FIG. 3.

The cap 8 acts on the rocker end 56 via its stem 33, and the cap 8 and the gearwheel 49 are jointly raised, for example by about 1 mm. This has the effect of preventing damage to the flat gasket 54, on which the cap 8 lies in the closed position, during subsequent swivelling of the cap 8. However, instead of the rocker 57, it is also conceivable to arrange on the upper side in the support part 39 underneath the stem 33 of the cap 8 a rotatably mounted ball, which in the closed position engages in a clearance correspondingly formed on the stem 33 on the underside and by way of which, after disengaging from the clearance, the cap 8 is raised upon swivelling in the opening direction. Furthermore, instead of the ball, the support part 39 may also be configured as a ramp underneath the stem 33, whereby the cap 8 can likewise be raised upon swivelling in the opening direction.

Thus, a partial clockwise turning of the suction removal tube 46 about the axis of its own body via the adjusting ring 12 causes the gearwheel 49 to be turned counterclockwise and causes the cap 8, fixedly connected to the gearwheel 49, to be swivelled laterally about the axis 36 of the bearing bolt 35 from a closed position I (dashed lines in FIG. 4) into an open position II (dot-dash lines in FIG. 4), thereby completely releasing the passage 5. In order to ensure a free swivelling action of the cap 8, the guide housing 43 has a slot 62, through which the cap 8 protrudes in its open position II. The slot 62 may, moreover, be covered by a flexible sealing lip which can be fastened on the guide housing 43.

For quick-as-possible actuation of the cap 8 between the open position II and the closed position I, the swivel axis 36 has the greatest possible distance from the filler neck and consequently from the passage axis 37. As a result, the swivelling angle between the two positions I and II is reduced, after which the suction removal tube 46 has to be turned by a smaller turning angle for swivelling the cap 8. The filling tube 63 of the fuel-pump nozzle 47 can then be introduced through the passage 5 into the filler neck 1.

Once filling the tank has been completed, the filling tube 63 of the robot-guided fuel-pump nozzle 47 is withdrawn from the filler neck 1 and then, for closing the cap 8, the suction removal tube 46 is turned counterclockwise. The cap 8 is swivelled by the gearwheel 49 into the closed position I. Finally, the suction removal tube 46 is drawn out of the guide housing 43, whereby the end 58 of the rocker 57 is relieved. The cap 8 lowers itself onto the seal 54 and is pressed thereon in a sealing manner by the spring force of the helical spring 51. A control on the robot monitoring the turning angle checks whether the cap 8 is closed.

Figure 5:
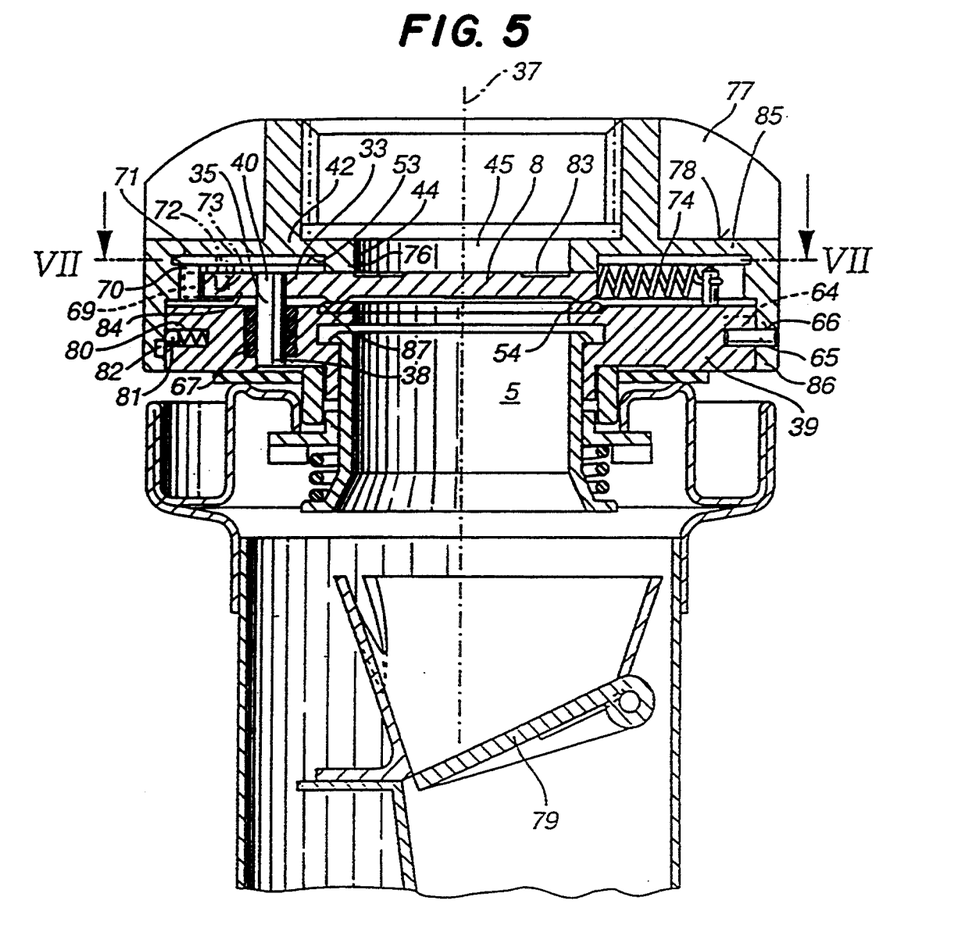
FIG. 5 is a cross-sectional view of another embodiment of the closure according to the present invention in the closed position, comprising a closure cap which can be swivelled about an axis parallel to the filler neck axis and can be relieved with respect to the opening.
Figure 6:
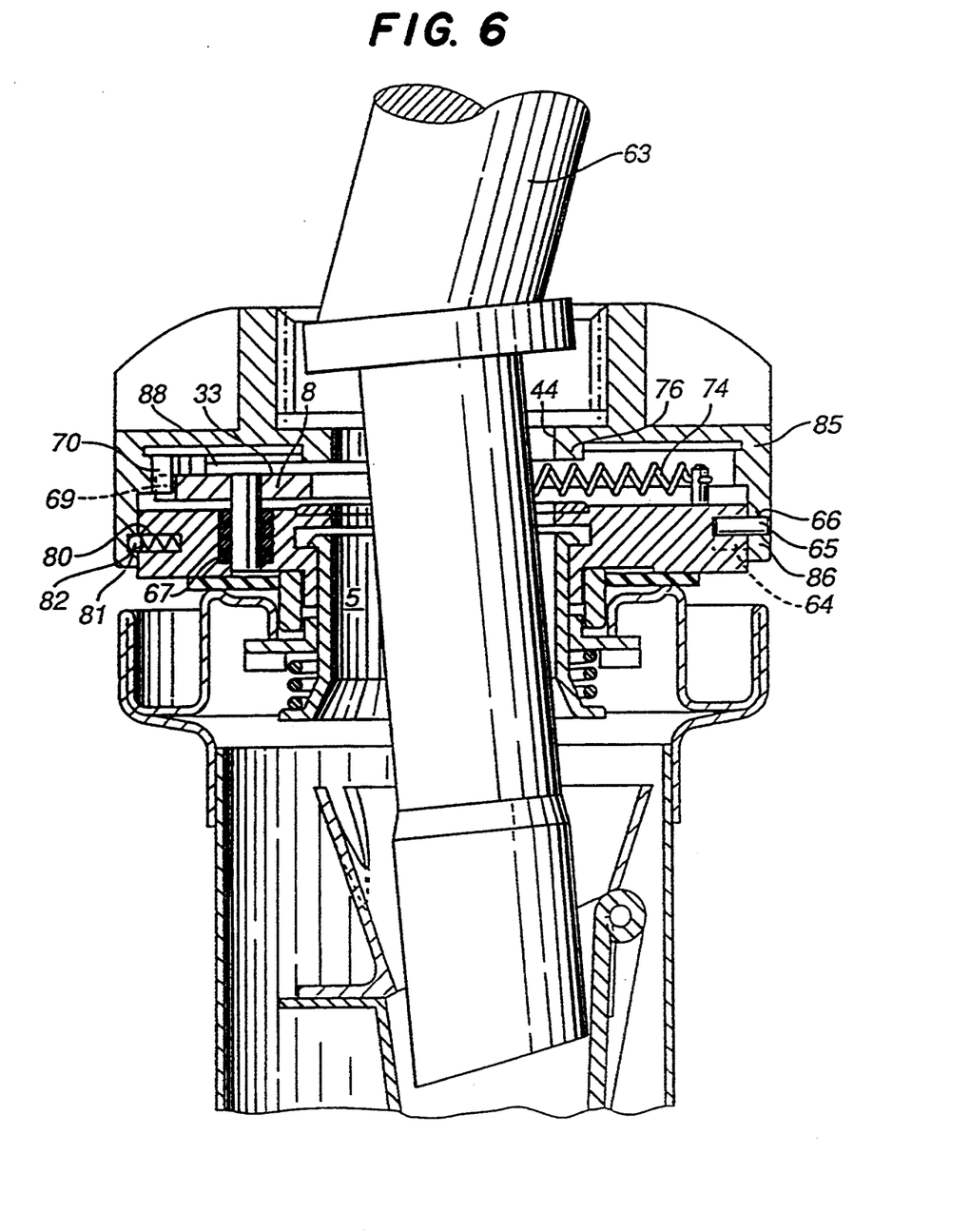
FIG. 6 is a cross-sectional view of the closure of FIG. 5 but in the open position, with the filling tube of a fuel-pump nozzle introduced into the filler neck ready for filling.
Figure 7:
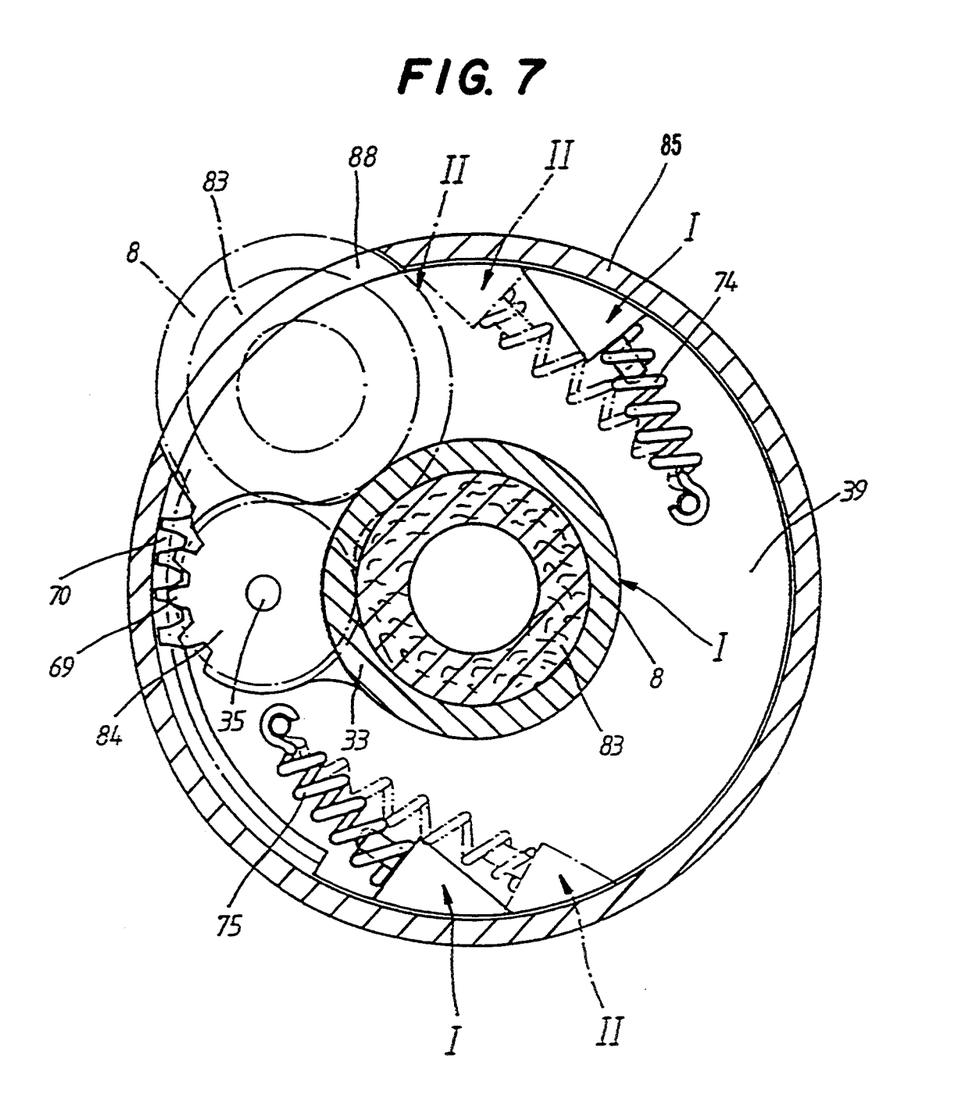
FIG. 7 is a cross-sectional view of the closure along line VII—VII of FIG. 5 in the closed position and the open position.

FIGS. 5 to 7 show another embodiment which is a variation of the embodiment of FIGS. 3 and 4. In particular, the adjusting ring 85 is configured as a guide housing in the manner of a union nut. Although the adjusting ring 85 surrounds the support part 39 coaxially, it is not fastened on the latter at its lower end 86. Rather, the annular support part 39 has on its outer circumference a self-locking screw thread 64, in the thread convolution of which there engage three pins 65 each respectively offset from the other by 120°, (only one pin is illustrated for simplicity), which are pressed into radially continuous bores 66 provided correspondingly in the region of the end 86 of the adjusting ring 85. The adjusting ring 85 is thus held on the support part 39 and, at the same time is guided screwably by the offset of the three pins 65 to be secure against tilting. The screw thread 64 can also be arranged on the inner circumference of the adjusting ring 85, and the pins 65 can be arranged on the outer circumference of the support part 39.

The lower end 38 of the bearing bolt 35 is mounted rotatably in a ball bush 67, which is arranged in the support part 39. The upper end 40 of the bolt 35 projects freely beyond the surface of the support part to the closure cap 8 in a rotationally fixed manner. The present invention also contemplates that the lower end 38 of the bearing bolt 35 can be pressed in the support part 39 and for the closure cap 8 to be arranged rotatably about the upper end 40. In this latter variation, it is essential for swivelling without any jamming that, in the open position, the cap 8 also just rests on the flat gasket 54 by its rim 68 facing the passage 5. It is also possible to swivel the closure cap 8 beyond this position. The cap 8 then falls in the open position II (FIG. 7) onto the support part 39. In order to avoid jamming of the cap on the seal 54 upon swivelling back into the closed position I, a chamfer 87 is cut on the outer circumference of the seal 54, over which chamfer the cap 8 can slide without interference onto the seal.

The circumference of the stem 33 of the cap 8 has a toothed segment 69 which represents the driving element and engages with a form fit in a toothed segment 70 of a hollow gearwheel. The toothed segment 70 lies opposite the first toothed segment 69 and is configured correspondingly as a mating form-fit element arranged on an inner side 71 of the adjusting ring 85 to form the counterpiece of the driving element. As a result, the gearwheel 49 of FIG. 3 embodiment can be dispensed with. As an alternative to the interengaging toothed segments 69, 70 for the form-fitting connection between the adjusting ring 85 and the closure cap 8, a peg 72 can be fastened, for example, on the underside 53 of the adjusting ring end face 42. The peg 72 protrudes towards the closure cap 8 and engages in a slot 73 which is arranged on the stem 33 in the region of the lever arm 84 and the width of which corresponds approximately to the diameter of the peg 72. It possible to kinematically reverse the parts such that the slot 73 can be arranged on the adjusting ring 85 and the peg 72 can be arranged on the upper side on the closure cap 8.

Furthermore, inside the adjusting ring 85 there are provided two tension springs 74, 75 which lie diametrically opposite the filler neck axis 37 and are fastened, on one hand, on the inner side 71 of the adjusting ring 85 and, on the other hand, on the support part 39. The rim 44 of the end face 42 of the adjusting ring 85 has a collar 76, which protrudes axially towards the closure cap 8 and, as FIG. 5 shows, in the closed position I presses the cap 8 onto the flat gasket 54.

For filling the tank, a conventional heat-pump nozzle suction removal tube (not shown in any further detail for purposes of simplification) engages directly on the form-fit elements 77 such as, for example, webs which are formed in an axially protruding manner on the upper side 78 of the adjusting ring end face 42. It is also conceivable for the outer circumference of the adjusting ring 85 to be shaped as a polygon or with a toothing around which, or in which, the respectively correspondingly configured suction removal tube engages with a form fit. Upon turning of the suction removal tube counterclockwise, the adjusting ring 85 is raised by the pins 65 in a screwing movement along the outer circumference of the support part 39. The rim section 76 of the adjusting ring end face 42 is thus lifted off the closure cap 8 against the restoring force of the tension springs 74, 75, thereby exerting stress in the closing direction and also eliminating the need for a rocker 57. At the same time, or if there is play between the inter-engaging toothings 69, 70 shortly thereafter, the cap 8 is swivelled on account of the engagement of the toothings 69, 70 of the adjusting ring 85 and of the cap 8 in each other in the bearing plane of the latter into the open position II, as seen in FIGS. 6 and 7, in the same sense or direction as the turning movement of the suction removal tube. The cap 8 thereby protrudes with one section through a slot 88 formed on the outer circumference of the adjusting ring.

Thereafter, the filling tube 63 is inserted through the adjusting ring 85 and the passage 5 into the filler nozzle 1 and penetrates through an unleaded valve 79 arranged there. Likewise as in the case of the exemplary embodiment above, it is favorable for quick swivelling to arrange the turning axis 36 as far away as possible from the filler neck axis 37, smaller swivelling angles being accomplished. For easier actuation of the cap 8 with less exertion of force, in particular in the case of manual tank filling, it is furthermore advantageous to configure the lever arm 84 as long as possible while the length of the counter-lever arm remains the same.

For manual tank filling, the support part 39 has on its circumference one or more clearances 80, in which engaging elements 81 in the form of spring-loaded balls are accommodated. The adjusting ring 85 has on its inner circumference facing the outer circumference of the support part 39, in the region of the end 48, engaging grooves 82 in which the balls engage on reaching the open position II of the cap 8. The engaging connection has the effect of holding the adjusting ring 85 and the cap 8 in the open position II and consequently permits manual tank filling without handling difficulties.

After filling the tank, the filling tube 63 is first withdrawn and then the adjusting ring 85 is turned clockwise by a short turning of the suction removal tube, with the engaging elements 81 being pressed away. Thereafter, the suction removal tube can be drawn off the adjusting ring 85, after which the latter and the closure cap 8 are brought into the closed position I by the restoring force of the tension springs 74, 75 acting as restoring springs. At the same time, the adjusting ring 85 is lowered to such an extent that the cap 8 is pressed in a sealing manner onto the flat gasket 54. An annular reflection fail 83 can be provided on the closure cap 8 on the upper side in the region covering the passage 5 by way of which the robot can check and control the momentary position of the closure cap 8 by using an optical sensor means and by way of which the fuel-pump nozzle 47 can be brought up to the filler neck 1 for filling the tank.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A closure for a fuel tank filler neck having a passage, comprising a closure cap arranged to be swivellably-mounted about a swivel axis on an upper side of said closure a lever arm arranged on a side of the swivel axis remote from said closure cap such that said closure cap is openable from a closed position by a force acting on the lever arm, the swivel axis being arranged at a rim of the filler neck and parallel to an axis of the filler neck, a driving element associated with said lever arm and arranged in proximity to the swivel axis which is between said closure cap and the driving element, outside a clear cross-section of the passage for effecting a swivelling movement of the closure cap, and an adjusting ring mounted concentrically with respect to the filler neck, via a corresponding mating form-fit element connected with a form fit to the driving element, for initiating the swivelling movement of said closure cap.

2. The closure according to claim 1, further comprising an opening device by means of which, for opening, while still in the closed position of the closure cap, the contact pressure of the latter against a seal surrounding the passage can at least be discontinued.

3. The closure according to claim 1, wherein the swivel axis is an axis of a bearing bolt on which the closure cap is rotatably arranged, the bearing bolt being received in a support part coupled onto the filler neck.

4. The closure according to claim 3, wherein the adjusting ring surrounds the closure in a housing-like manner, the support part has on an outer circumference thereof a thread on which the adjusting ring is held such that the adjusting ring can be screwed along the filler neck axis, and the closure cap being pressable in the closed position onto the seal by the adjusting ring, in the manner of a union nut, by a protruding collar.

5. The closure according to claim 4, wherein a thread pitch of the thread for the adjusting ring is nonuniform with a small ramp and has a groove in which a pin engages.

6. The closure according to claim 4, wherein the driving element is a toothed segment formed on the outer circumference of the stem, and the mating form-fit element is a toothed segment of a hollow gearwheel formed on the inner circumference of the adjusting ring.

7. The closure according to claim 4, wherein pairing of the driving element is formed by a radial slot on one of the pairing, and as the mating form-fit element, is formed on the other of the pairing by a peg.

8. The closure according to claim 4, wherein at least one prestressed engaging element is arranged in an outer circumference of the support part such that the engaging element can engage in the open position of the closure cap in an engaging groove provided on the inner circumference of the adjusting ring.

9. The closure according to claim 4, wherein at least one tension spring is arranged inside the adjusting ring to act as a restoring spring such that the at least one tension spring stresses the adjusting ring in the closing direction and is fastened at an inner circumference and at the support part.

10. The closure according to claim 4, wherein the adjusting ring includes on an outer side thereof additional form-fit elements which are connectable with a form fit to the fuel-pump nozzle such that a swivelling of the closure cap is initiatable by a turning movement of the fuel-pump nozzle.

11. The closure according to claim 4, wherein the adjusting ring has a slot along the outer circumference thereof and through which the closure cap is protrudable for reaching the open position.

12. The closure according to claim 1, wherein at least one marking is arranged in a passage region on the upper side of the closure cap such that a fuel-pump nozzle can be brought under robotic control using a sensor means up to the filler neck for tank filling.

* * * * *